(12) United States Patent
Mohen et al.

(10) Patent No.: US 10,331,747 B1
(45) Date of Patent: Jun. 25, 2019

(54) METHOD AND SYSTEM FOR CREATING AND USING PERSONA IN A CONTENT MANAGEMENT SYSTEM

(71) Applicant: Open Text Corporation, Waterloo (CA)

(72) Inventors: Michael T. Mohen, Millington, MD (US); Ameya Devendra Bapat, Bangalore (IN); Derek Zasiewski, Oakville (CA); Paul Craig Warren, Pleasanton, CA (US)

(73) Assignee: Open Text Corporation, Waterloo (CA)

( * ) Notice: Subject to any disclaimer, the term of this patent is extended or adjusted under 35 U.S.C. 154(b) by 483 days.

(21) Appl. No.: 14/871,557

(22) Filed: Sep. 30, 2015

(51) Int. Cl.
*G06F 16/30* (2019.01)
*G06F 16/9535* (2019.01)
*H04L 29/08* (2006.01)
*G06F 16/335* (2019.01)

(52) U.S. Cl.
CPC .......... *G06F 16/9535* (2019.01); *H04L 67/10* (2013.01); *G06F 16/335* (2019.01)

(58) Field of Classification Search
None
See application file for complete search history.

(56) References Cited

U.S. PATENT DOCUMENTS

| | | | |
|---|---|---|---|
| 7,617,205 B2 * | 11/2009 | Bailey | G06F 17/3064 |
| 2007/0185858 A1 * | 8/2007 | Lu | G06F 17/30864 |
| 2010/0250578 A1 * | 9/2010 | Athsani | G06F 17/30867 707/765 |
| 2014/0237587 A1 * | 8/2014 | Forbes | G06F 21/32 726/18 |
| 2014/0324881 A1 * | 10/2014 | Ransil | G06F 17/30336 707/741 |

* cited by examiner

*Primary Examiner* — Jau Shya Meng
(74) *Attorney, Agent, or Firm* — Sprinkle IP Law Group

(57) ABSTRACT

A method and system for servicing requests, including receiving, from a client, a first request to perform an action, obtaining a first persona object for a user associated with the first request, servicing the first request using the first persona object to obtain a result, and providing the result to the client.

20 Claims, 8 Drawing Sheets

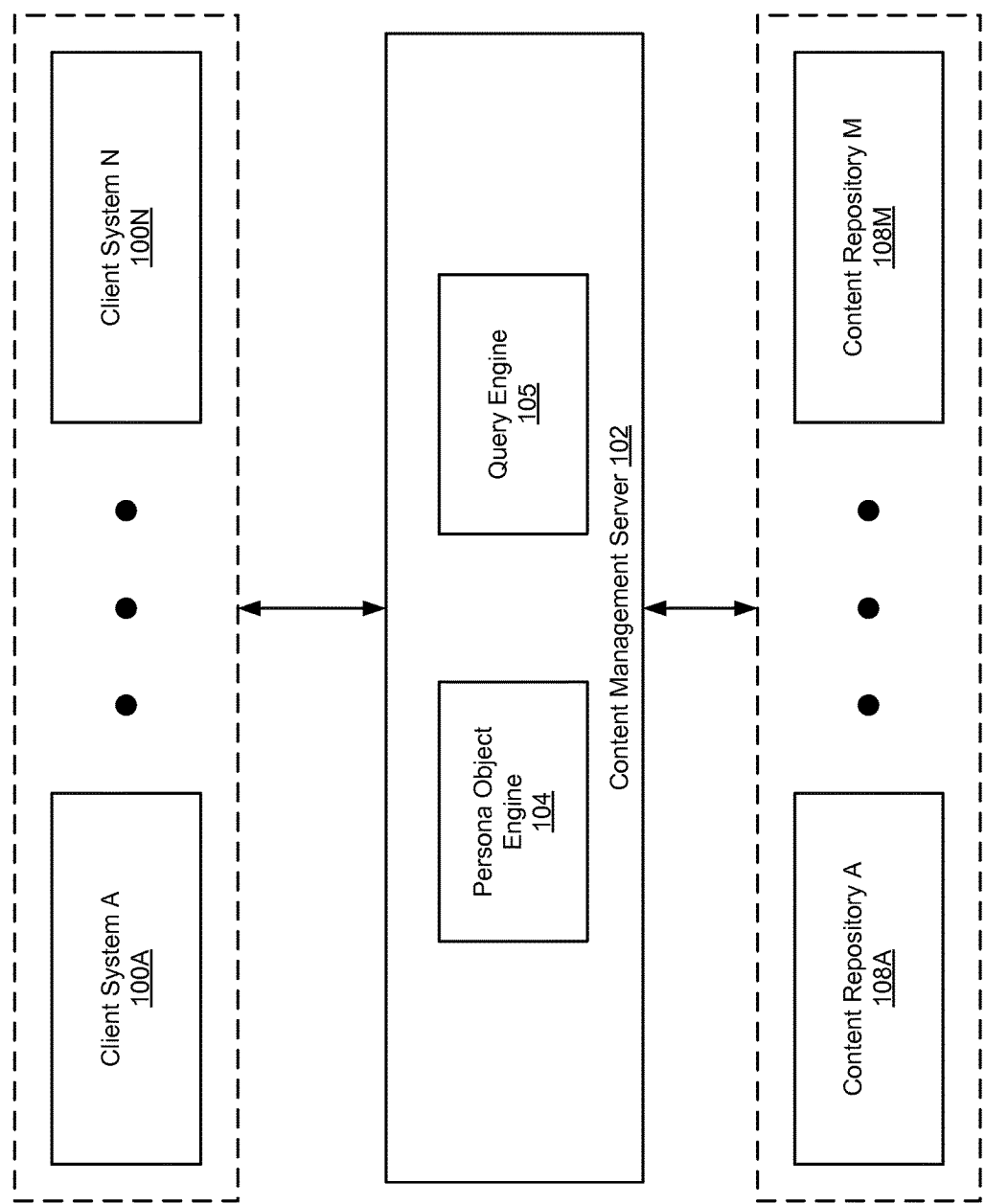

METHOD AND SYSTEM FOR CREATING AND USING PERSONA IN A CONTENT MANAGEMENT SYSTEM

BACKGROUND

Significant amounts of content are stored in content repositories. Given the large amount of content, it is difficult for users to easily identify and obtain relevant content from the content repositories.

BRIEF DESCRIPTION OF DRAWINGS

FIG. 1 shows an exemplary system in accordance with one or more embodiments of the technology.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-6, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for creating and using persona objects in a content management system. More specifically, embodiments of the technology relate to tracking user actions using action tracking entries and then using the action tracking entries to create a persona object for a user (or for a group of users). The personas objects may then be used, for example, to service requests for content from the client systems. In one embodiment of the technology, the persona objects may be used to modify query requests and/or to modify the ranking of objects that are retrieved in response to the query request.

FIG. 1 shows an exemplary system in accordance with one or more embodiments of the technology. The system includes one or more client systems (100A, 100N), a content management server (102), and one or more content repositories (108A, 108M). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system (100A, 100N) corresponds to any computing system (see e.g., FIG. 6) that includes functionality to issue requests to the content management server (102) and to receive a corresponding response(s) from the content management server after the request has been serviced.

Figure 2A:
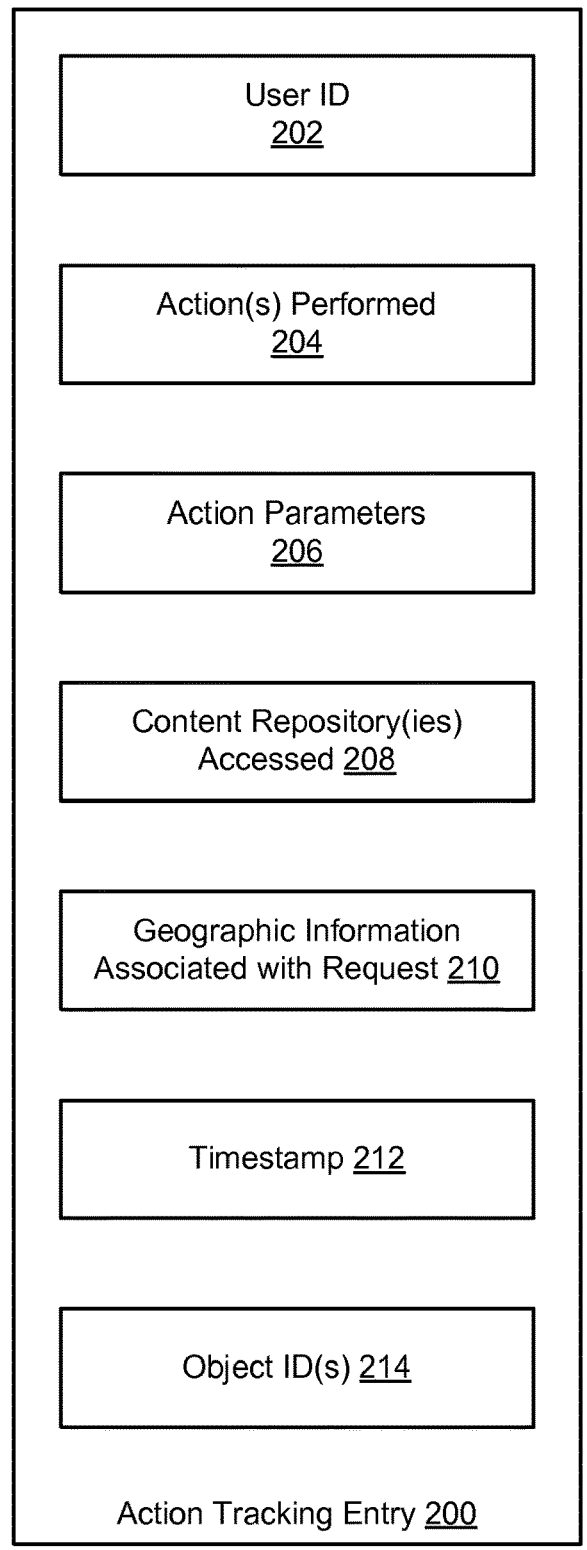
FIG. 2A shows an exemplary action tracking entry in accordance with one or more embodiments of the technology.
Figure 2B:
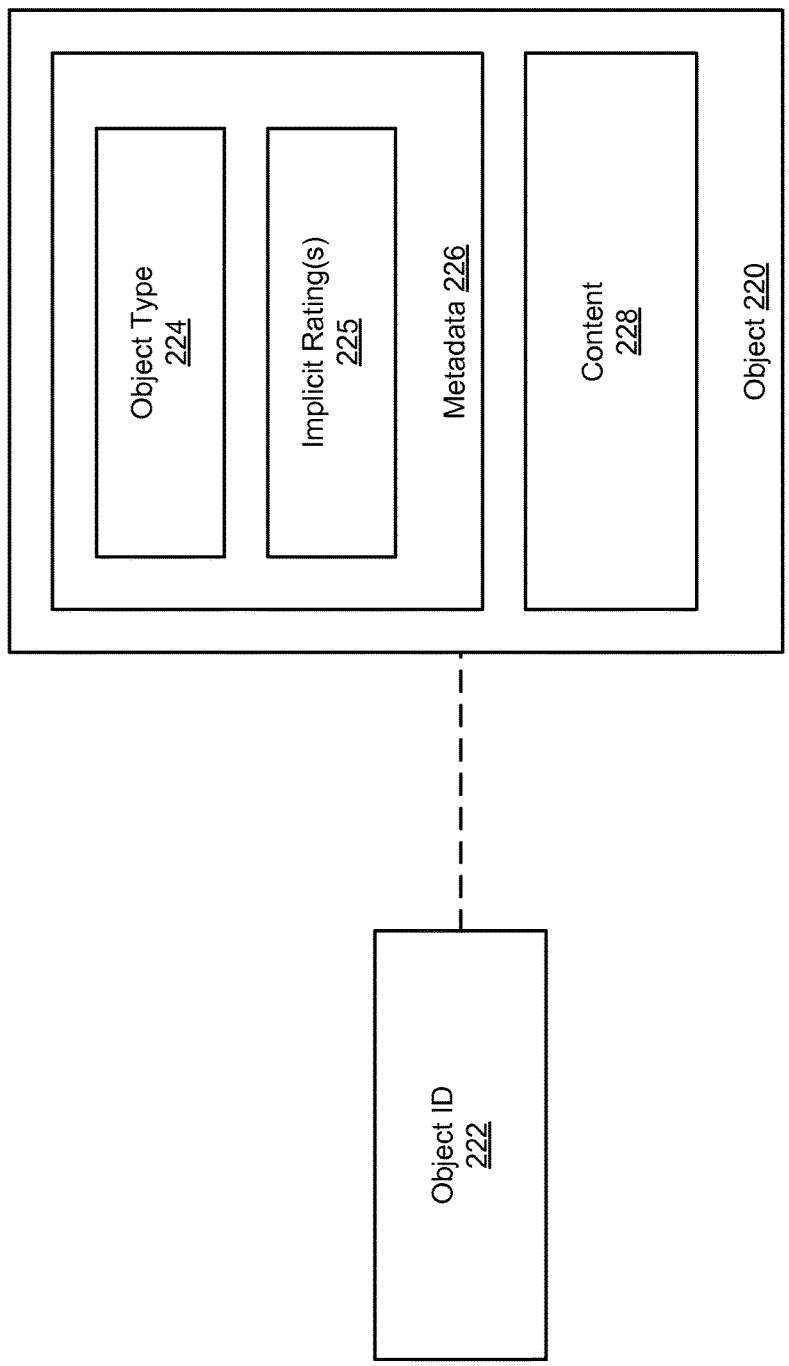
FIG. 2B shows an exemplary object in accordance with one or more embodiments of the technology.
Figure 2C:
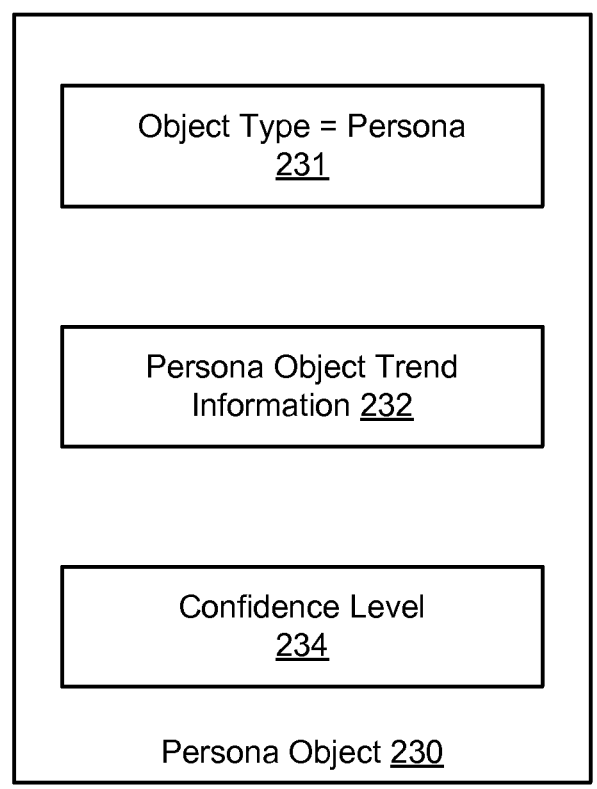
FIG. 2C shows an exemplary persona object in accordance with one or more embodiments of the technology.
Figure 3:
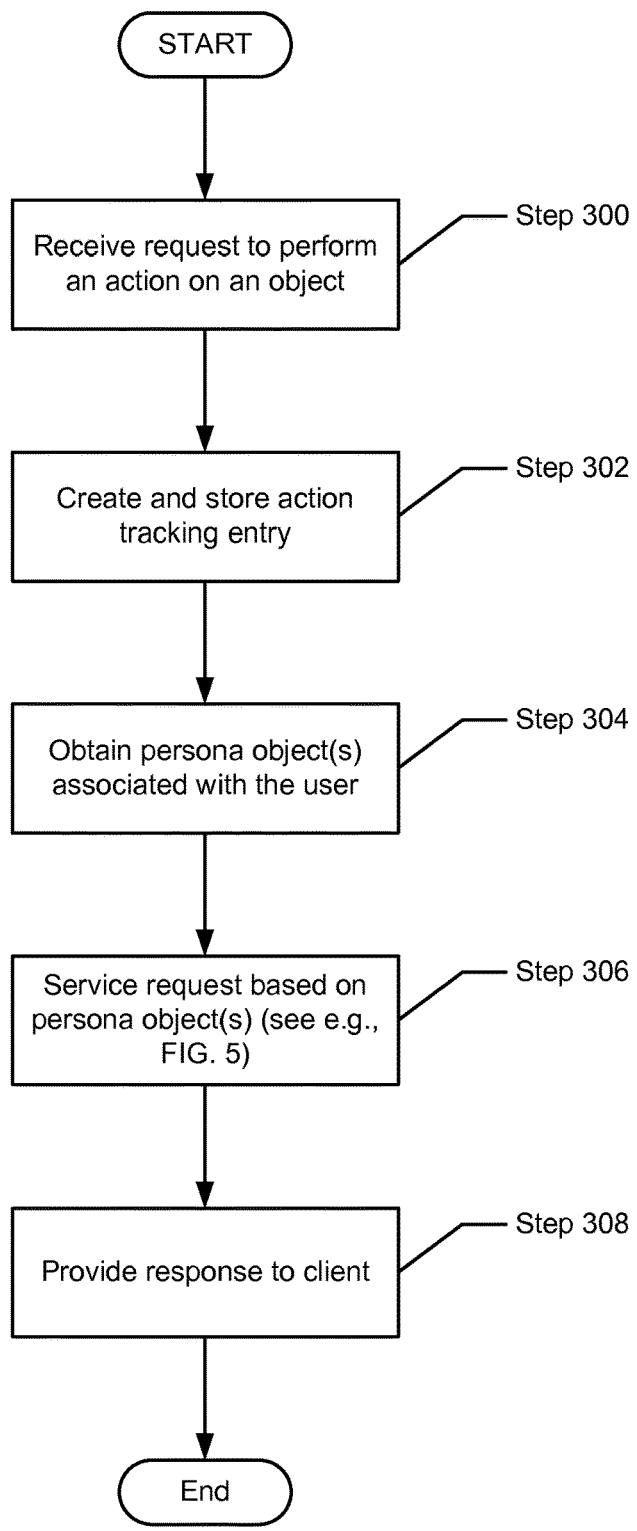
FIG. 3 shows an exemplary method for servicing requests in accordance with one or more embodiments of the technology.
Figure 4:
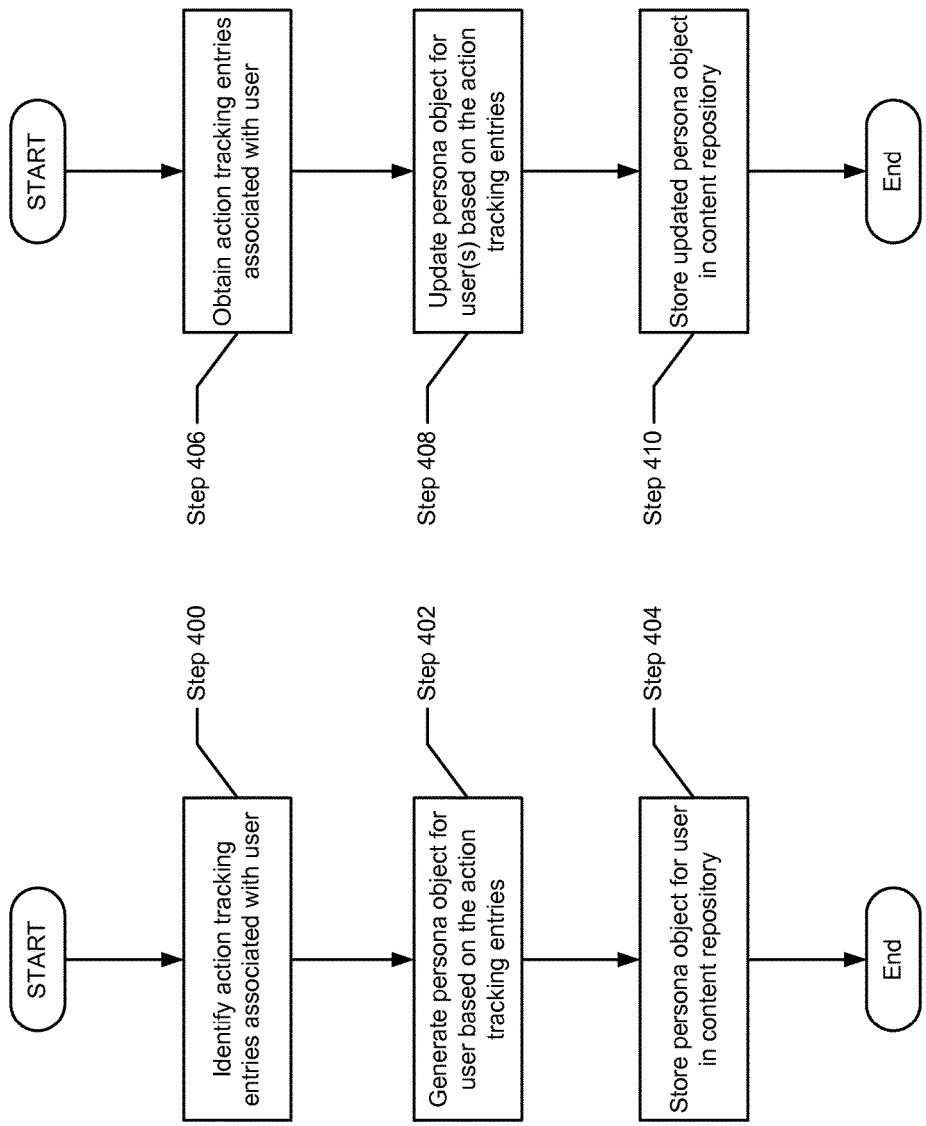
FIG. 4A shows an exemplary method for creating a persona object in accordance with one or more embodiments of the technology.
FIG. 4B shows an exemplary method for updating a persona object in accordance with one or more embodiments of the technology.
Figure 5:
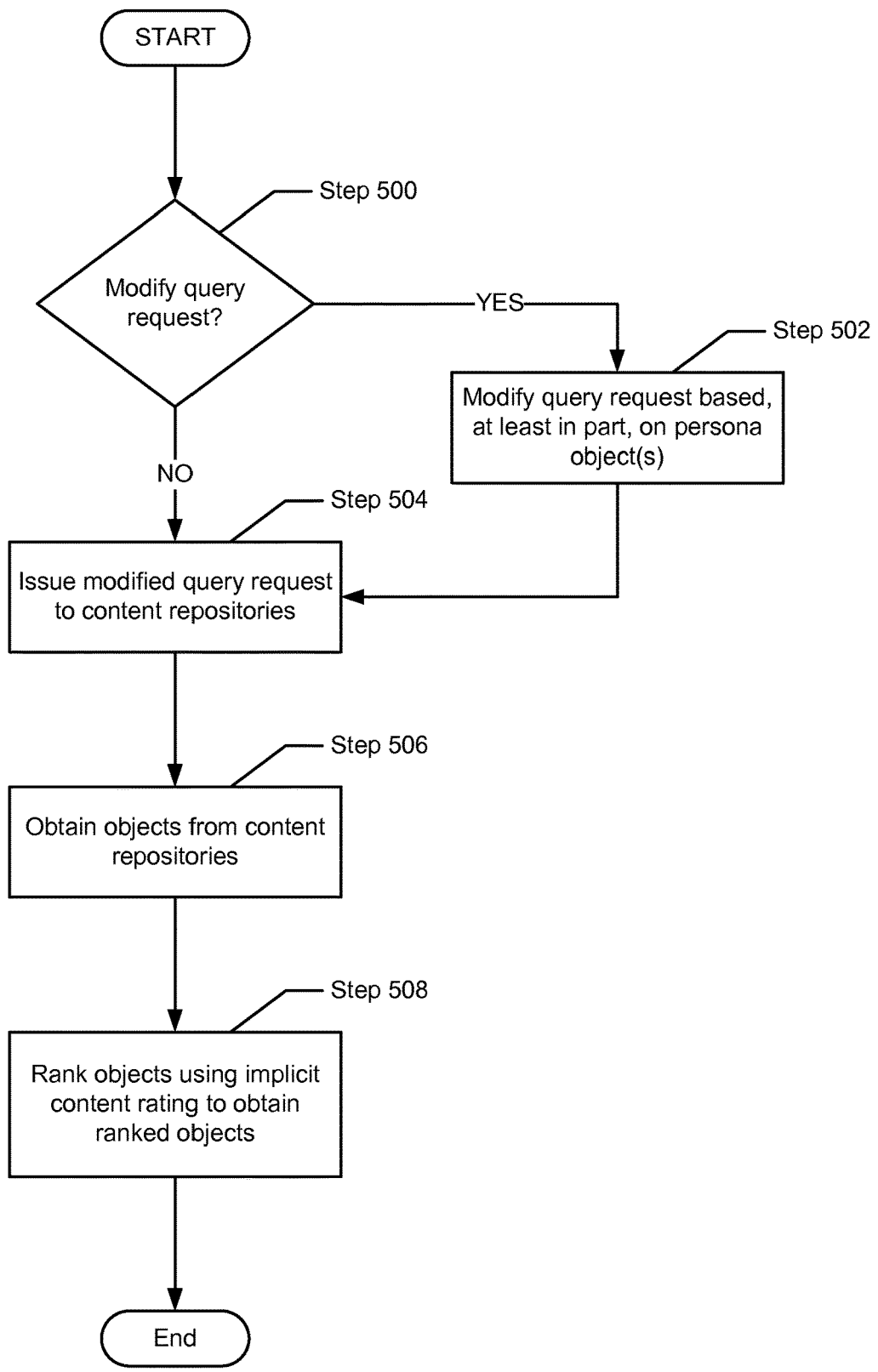
FIG. 5 shows an exemplary method for serving a query request using one or more persona objects in accordance with one or more embodiments of the technology.

Continuing with the discussion of FIG. 1, the content management server includes functionality to perform the methods shown in FIGS. 3-5. Further, the content management server may include functionality to receive requests from one or more clients systems and to service such requests using the query engine (105) and the persona object engine (104). The content management server may also include functionality to perform various actions (e.g., read, write, delete, modify, etc.) on the objects stored in the content repositories when servicing requests from the client systems. In one embodiment of the technology, the persona object engine (104) includes functionality to create and store action tracking entries (FIG. 2A) and create and/or update persona objects (see e.g. FIG. 2C) based on information in the action tracking entries. See e.g., FIGS. 3-4B. Further, the persona object engine includes functionality to provide persona objects to the query engine (or other processes executing in the content management system). See e.g., FIG. 5. The persona object engine may also include functionality to determine (and update) a confidence level associated with one or more persona objects. Additional detail about the confidence level associated with the persona object is provided below with respect to, e.g., FIGS. 2C, 3, and 5.

In one embodiment of the technology, the content management system stores objects. The general structure of an object is shown in FIG. 2B. One specific type of object that is stored in content management system is a persona object. Additional detail about the persona objects is provided in FIG. 2C.

In one embodiment of the technology, the query engine (105) includes functionality to receive query requests, process query requests in accordance with FIGS. 3 and 5 and provide the query results to the appropriate client(s).

In one embodiment of the technology, the content management service includes functionality to determine one or more implicit ratings for objects in the content repositories. Additional detail about the generation and use of the implicit ratings is described below. See e.g., FIGS. 2B, 3 and 5.

Figure 6:
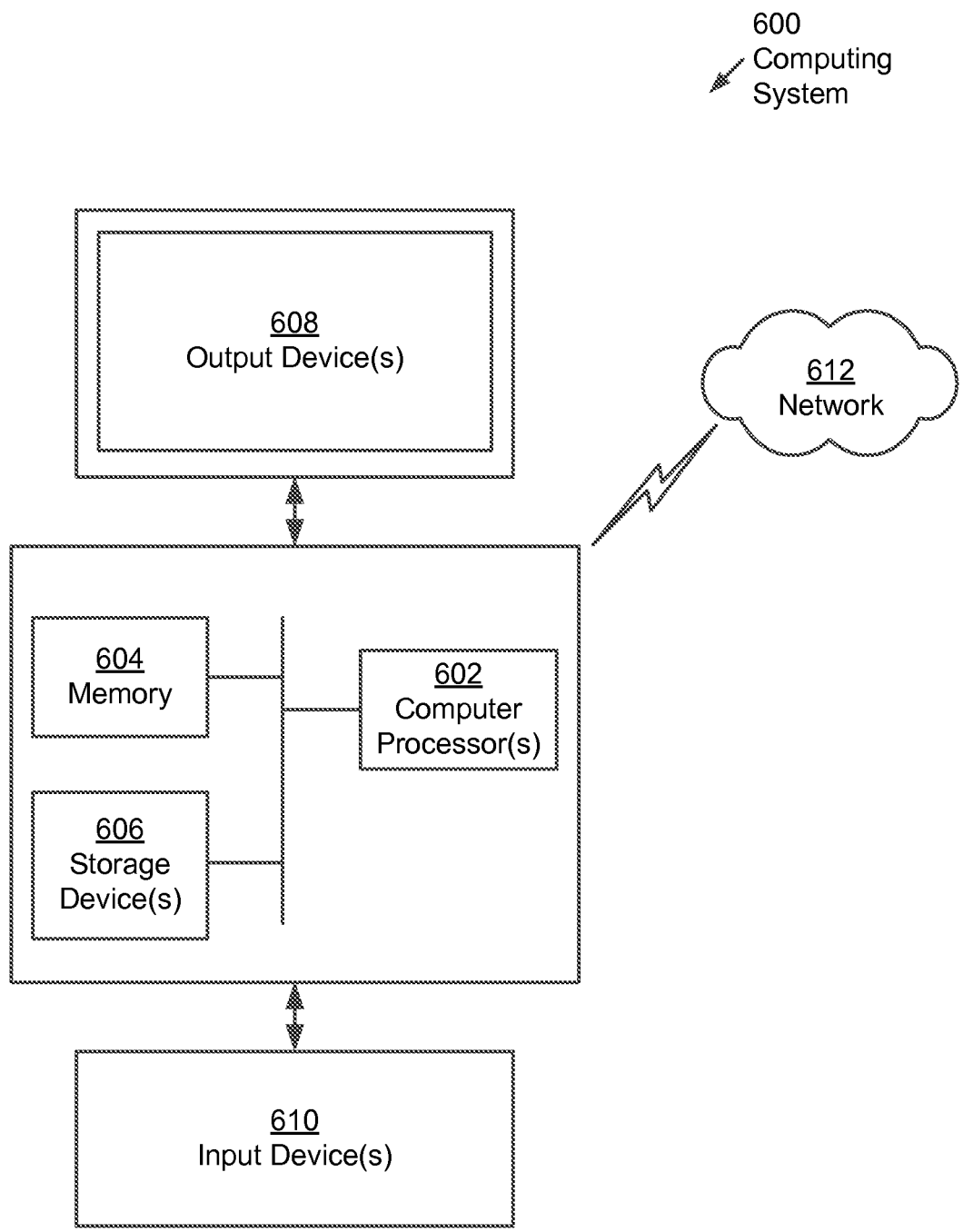
FIG. 6 shows a computing system in accordance with one or more embodiments of the technology.

The content management server may be implemented using one or more computing systems (see e.g., FIG. 6).

In one embodiment of the technology, each content repository (108A, 108M) includes persistent storage (e.g., solid state storage, magnetic storage, optical storage, any other type of persistent storage or any combination thereof) in which objects (see e.g., FIGS. 2B, 2C) and action tracking entries (see e.g., FIG. 2A) are stored.

Continuing with the discussion of the content repositories, each of the content repositories may store objects and action tracking entries using any known or subsequently discovered mechanism. The following describes various examples of the mechanisms that may be used to store objects and action tracking entries. The examples are not intended to limit the technology. In a first example, the content repository (108A, 108M) may be a set of magnetic hard disks. In a second example, the content repository (108A, 108M) may be implemented using a computer cluster that is executing a distributed file system. In a third example, the content repository (108A, 108M) may be implemented using a network file server and one or more block-storage devices (i.e., as a Storage Area Network).

The technology is not limited to the architecture of the system shown in FIG. 1.

FIG. 2A shows an exemplary action tracking entry (200) in accordance with one or more embodiments of the technology. In one embodiment of the technology, action tracking entries include information about actions that are performed on objects. The action tracking entries (200) may be used to generate and/or update persona objects (see FIG. 2C). Further, the action tracking entries may be used to update the implicit rating(s) associated with one or more objects. See e.g. FIG. 2B.

Each action tracking entry (200) may include (or specify) one or more of the following: (i) user ID (202), which identifies the user that initiated (or triggered) the action; (ii) the action(s) performed (204) (e.g., read, write, modify, download, search, etc.); (iii) action parameters (206) that were used to perform the action (e.g., if the action is "Search" then the action parameters may correspond to the search string input by the user); (iv) content repositories accessed (208), which specifies which content repositories were used to perform the action (e.g., if the action was a read request for an object, then content repository (208) specifies from which content repository the requested object was retrieved); (v) geographic information associated with the requests (210), which specifies the geographic location of the user (or client system) that initiated (or triggered) the action and/or the language used to specify the action or any action parameters (e.g., the action parameters were specified in Spanish from a user located in Argentina); (vi) a timestamp (212) which specifies the date and time that the action was initiated and/or triggered; and (vii) the object ID(s) (214) of the objects on which the action was performed (e.g., if the action is a download request, the object ID corresponds to the object that downloaded; in another example, if the action is a query request, then the object IDs may correspond to the objects that were identified in response to the query request).

The action tracking entries are not limited to the action tracking entries shown in FIG. 2A. Specifically, the action tracking entries may include (or specify) additional and/or different information about an action without departing from the technology.

FIG. 2B shows an exemplary object in accordance with one or more embodiments of the technology. The object (220) corresponds to a combination of content (228) and the metadata (226) associated with the content. The metadata (226) may include the object type (224), one or more implicit ratings (225) associated with the object as well as any other metadata associated with the object. Examples of metadata may include, but are not limited to, author, content name, creation time, creation date, size of object, modification time, modification date, object format (i.e., the format of the content (228), e.g., portable document format (PDF), MPEG-4, .txt., etc.). With respect to the content, the content may correspond to any type of structured and unstructured data that may be stored in the content repository. Examples of content may include, but are not limited to, text files, audio files, image files, database records, and/or audio-visual files.

In one embodiment of the technology, the object type (224) is used to identify the nature of the content stored in the corresponding object. For example, an object type of "document" may be used for objects such as text file, image files, etc. In another example, an object type of "video" may be used for objects such as video files or multimedia files. The content repository may support other object types without departing from the technology.

In one embodiment of the technology, an implicit rating indicates whether a given user (or set of users) finds the particular object to be relevant. The implicit rating for a given object is based on actions that are performed (or not performed) on the object. For example, if a user downloads a document, then the implicit rating of the document is increased. In contrast, if no user performs any action on a given object then the object may have a low implicit rating.

In embodiment of the technology, the implicit rating of each object is initially set at zero and then is modified based on actions performed on the object. Actions that may increase the implicit rating of an object may include, but are not limited to, downloading the object, viewing the object (i.e., viewing the metadata and/or content), how long the user views the object (i.e., the metadata and/or content). If no actions are performed on a given object, then the implicit rating may decrease overtime. For example, if the object has an implicit rating of 5 and then there are no actions performed on the object for a 6-month period, then the implicit rating of the object may decrease to zero at the end of the 6-month period.

In embodiment of the technology, the implicit rating may be associated with a given user or may be associated with a set of users. In the former scenario, the implicit rating (225) may specify a set of tuples, where each tuple includes <user ID, implicit rating>. In the latter scenario, the implicit rating may specify one or more tuple, where each type includes <user group ID, implicit rating> or <persona object ID, implicit rating>. If a user group ID is included in the tuple, then the user group ID may uniquely identify a group of users.

As discussed above, the implicit rating is based on actions performed (or not performed) on objects. Accordingly, the action event entries that are used to update the implicit ratings on a given object may vary based on the nature of the implicit rating. For example, consider a scenario in which there is an object that has a first implicit rating (IR1) associated with user A and a second implicit rating (IR2) associated with user B. When user A performs an action on the object, IR1 is updated (or may be updated) while IR2 is unchanged. Similarly, if user B performs an action on the object, IR2 is updated (or may be updated) while IR1 is unchanged. However, if the object instead has an implicit rating (IR3) that was associated with a group of users that included user A and user B, then any action performed on the object by either user A or user B would result in IR3 being updated (or potentially being updated).

In another embodiment, a single action event entry may potentially update multiple implicit ratings for an object. For example, consider a scenario in which there is an object that has a first implicit rating (IR1) associated with user A, a second implicit rating (IR2) associated with user B, and third implicit rating (IR3) associated with group of users that includes user A and user B. When user A performs an action on the object, IR1 and IR3 are updated (or may be updated) while IR2 is unchanged. Similarly, if user B performs an action on the object, IR2 and IR3 are updated (or may be updated) while IR1 is unchanged.

Continuing with the discussion of FIG. 2B, in one embodiment of the technology, each object (220) may be identified using an object ID (222). The object ID uniquely identifies the object in the content repository. The object ID may be any combination of numbers, letters, and symbols.

In one embodiment of the technology, the metadata and content associated with a given object may be stored in a single location. Alternatively, the metadata associated with an object may be stored in a first location and the content associated with a given object may be stored in a second location, where the first and second locations may be in the same or different content repositories.

FIG. 2C shows an exemplary persona object in accordance with one or more embodiments of the technology. In general, a persona object (230) includes information about a persona. A persona, in one embodiment of the technology, specifies trends associated with a user or group of users. In this particular technology, the persona specifies trends about how the user or group of users interacts with content stored in one or more content repositories.

Each persona object (230) may be associated with a user or group of users. If the persona object (230) is associated with a single user, then the content of the persona object may only be based the action event entries that are associated with the single user. If, however, the persona object is associated with a group of users, then the content of the persona object may be based on the action event entries that are associated with all the users in the group of users.

The persona objects may be created in accordance with FIG. 4A and may be updated in accordance with FIG. 4B. Further, in one embodiment of the technology, one or more persona objects may be obtained from a third party and then subsequently updated in accordance with FIG. 4B.

Continuing with the discussion of FIG. 2C, the persona object (230) includes an object type (231) of "persona." Further, the persona object includes persona object trend information (232). The persona object trend information may include any type of information that is based on analysis of aforementioned action event entries. Examples of the type of information that may be included in the object trend information may include, but are not limited to: (i) which content repositories include objects that the user or users associated with the persona object find most relevant; (ii) what search terms (or query terms) are used by the user(s) of the persona to obtain relevant content from the content repository; (iii) what specific objects (or object types) does the user(s) associated with the persona object find most relevant; and (iv) the language that is primarily used by the user's associated with the persona.

The persona object (230) may include in a confidence level (234) that specifies the effectiveness of the persona object for the user(s) with which it is associated. Said another way, the confidence level (234) quantifies whether the persona object is able to effectively (or accurately) predict what content will be most useful to the user(s) associated with the persona object. For example, consider a scenario in which a user issues a query and, based on the persona object, the content management system provides a result that includes a ranked list of ten objects (numbered 1-10) to the user. Further, for purposes of this example assume that object 1 is the highest ranked object and object 10 is the lowest ranked object in the result.

If the user selects object 1, then the persona object may be deemed to have a high confidence level (e.g., >80%) as content management system was able to use to the persona object to provide relevant content to the user. In contrast, if the user indicates object 5 is the most relevant than the confidence level of the persona object may be deemed to be average (e.g., approximately 50%). Further, if the user indicates that none of the objects in the result are relevant than the confidence level of the persona object may be low (e.g., <5%).

The confidence level of a persona object may change over time as the user(s) associated with the persona object interacts with the content management system and the objects stored in the content management system.

FIGS. 3-5 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel.

Turning to FIG. 3, FIG. 3 shows a method for servicing requests in accordance with one or more embodiments of the technology.

In step 300, a request is received by the content management service from a requesting entity (e.g., a client system). In one embodiment of the technology, the request may include an object ID and an action(s) to be performed on (or with) the object (or a portion thereof) associated with the object ID. The request may include additional information (e.g., parameters associated with the action) without departing from the technology. The action may correspond to any action that may be performed on any portion of the object (i.e., on the content or metadata, see e.g., FIG. 2B). Examples of actions may include, but are not limited to, read, write, modify, delete, download and query. In one embodiment of the technology, the request may specify a set of objects using, e.g., object IDs or a regular expression. In one embodiment of the technology, the request may specify an action (e.g., a query) and not include any object IDs.

In the event that the request specifies multiple objects and/or multiple actions, one or more of the steps in FIG. 3 may be performed for every <object ID, action> pair.

In step 302, an action tracking entry for the action (i.e., the action request in step 300) is created and stored. The action tracking entry may include all or portion of the content shown in FIG. 2A. Further, in step 302 the content of the action tracking entry may be updated once the request is serviced in step 306. For example, if the action is a query action, then the content repositories accessed (208) and the object ID(s) for objects (214) obtained in response to the query action may be stored in the action tracking entry after step 306.

Continuing with the discussion of FIG. 3, in step 304, a persona object associated with the user is obtained. The persona object obtained in step 304 may be a persona object that is specific to the user or a persona object with which the user and other users are associated.

In step 306, the request is serviced. Depending on the nature of the request, serving the request may or may not require the use of the persona object. For example, if the request is a write request to a specific object, then the persona object may not be used. One scenario in which the persona object is used to service the request is a query request. Additional detail about how a persona object may be used to service a query request is shown in FIG. 5.

In another example, the persona object may be used to service a read request. For example, consider a scenario in which the user issues a read request for Object 1, which is an English language text document, and the user is associated with a persona object, which specifies that the user primarily uses French. In servicing the read request, the content management system may locate the requested English language object and also attempt to locate a corresponding French language object. If a corresponding French language object is located, then the user may be presented with both the English language object and the French language object. Alternatively, the user may be presented with only the French language object or the user may be presented with only the English language object and a URL link to the corresponding French language object.

Continuing with the discussion of FIG. 3, in step 308, the results of the request are provided to the user. The result may include zero, one, or more objects along with other information generated when the requested was serviced (e.g., notices issued by the content management system).

As discussed above, the actions requested by the user result in the generation of action tracking entries. These action tracking entries may be used, for example, to generate and/or update a persona object. The following sections describe how the action tracking entries may be used to created and/or update persona objects. The methods shown in FIGS. 4A and 4B may be performed in parallel with the method shown in FIG. 3.

FIG. 4A shows a method for creating a persona object in accordance with one or more embodiments of the technology.

In step 400, one or more tracking action entries associated with the user are identified. In the event that a persona object is being created for a group of users, then the action tracking entries associated with the group of users are obtained.

In step 402, the contents of the action tracking entries is analyzed to determine persona object trend information (see e.g., FIG. 2C). The persona object is subsequently created, where the persona object includes the object trend information.

In step 404, the persona object created in step 402 is stored in the content repository. In one embodiment of the technology, the content management system may maintain a mapping of persona object to user(s). This mapping may then be used to obtain the relevant persona object(s) when updating persona objects (as in FIG. 4B) and/or serving requests (as shown in FIG. 3).

FIG. 4B shows a method for updating a persona object in accordance with one or more embodiments of the technology. As discussed above, the persona object may change over time. In particular, as the actions performed by the user(s) associated with the persona object change, the persona object trend information may also change to reflect the how the user(s) associated with the persona is interacting with the content in the content repository.

In step 406, one or more action tracking entries are obtained. The action tracking entries obtained in step 406 may correspond to action tracking entries that were not previously processed in FIG. 4A and/or during a prior iteration of FIG. 4B. The action tracking entries may be associated with one or more users.

In step 408, one or more persona objects are updated (or may be updated) based on the action tracking entries obtained in step 406. For example, if the system maintains a first persona object for a user and, in addition, a second persona object for a group of users that includes the user, the step 408 may include determining whether to update the first persona object and the second persona object based on the action tracking entries obtained in step 406. If an update is required, then the appropriate persona objects are updated. In one embodiment, updating the persona object may include updating the persona object trend information and/or the confidence level.

In step 410, if the persona object(s) is updated, then the updated persona object(s) is stored in the content repository.

The process shown in FIG. 4B may occur each time a new action tracking entry is stored (per FIG. 3) and/or periodically. The frequency at which FIG. 4B is perform may be set in order to enable the persona objects to have a high confidence level. Said another way, if the users associated with the persona object are performing actions that result in a high confidence level of the persona object, then FIG. 4B may be performed less frequently. However, if the users associated with the persona object are performing actions that result in a low confidence level of the persona object, then FIG. 4B may be performed more frequently.

In one embodiment of the technology, FIG. 4B may be performed at a higher frequency in order ensure that the confidence level accurately reflects the actions performed by the associated user(s). In such cases, FIG. 4B may only result in the confidence level being updated. In the same scenario and, potentially at a lower frequency, the persona object trend information may be updated using FIG. 4B.

As discussed above, the persona objects may be used during the servicing of various requests. One such request is a query request. FIG. 5 shows an exemplary method for servicing a query request using one or more persona objects in accordance with one or more embodiments of the technology.

The method shown in FIG. 5 corresponds to steps that may be performed when servicing the request in FIG. 3, Step 306.

In step 500, a determination is made about whether to modify the query request. The determination in step 500 may be based on whether the persona object trend information includes any information that may be used to augment or modify the query request. For example, if the persona object trend information indicates that the user primarily reads French language objects, then the query request may be modified to locate French language objects. In another example, the persona object trend information indicates that the user prefers to read journal articles from a certain publisher(s) (e.g., IEEE); in such scenarios, the query request may be modified to search for objects that were published by the preferred publishers.

In step 502, the query request is modified based on the determination made in step 500. The process then proceeds to step 504.

In step 504, the query request (modified query request) is issued to one or more content repositories. For example, the query request may be issued to all or a subset of the content repositories. In one embodiment, the persona object trend information may indicate that objects that the user has historically found to be relevant (based on various action tracking entries) are primarily located in two out of the five available content repositories. In this scenario, the query request may be issued to the two identified content repositories.

In step 506, zero, one, or more objects are obtained from the content repository(ies) in response to the query issued in step 504.

In step 508, the objects (if more than one is returned) are ranked. The ranking may be performed using the implicit rating associated with one or more of the objects. For example, if the objects have implicit rating associated with the persona object (i.e., the persona object associated with the user that issued the query request), then the implicit ratings may be used, at least in part, to ranking the objects. If implicit ratings are not associated with the objects, then the objects may be ranked using other information in the persona object trend information such as based on preferred language. Alternatively, the objects are ranked using, for example, other methods that do not take into account the persona object trend information. Once step 508 is complete, the process may proceed to step 308 in FIG. 3.

Embodiments of the technology enable the tracking of actions that are performed by user on objects in content repositories. This tracked information may be used to develop persona objects than enable more relevant objects to be provided to the user. Further, this tracked information may be used to validate and/or update the persona objects, which in turn, may be used to present more relevant content to the user. In addition, the tracked information may be used to ranking objects relevance on a per persona basis, which in turn, may also be used to present more relevant content to the user. Thus, the technology described herein provides a mechanism to provide relevant content to a user and incorporates various feedback mechanisms to adapt to changing user requirements.

In one embodiment of the technology, the content management system may also use the persona object to proactively recommend objects in the content repository to a user. For example, if the persona object is associated with a group of users (e.g., users 1-10) and users 4-10 find a particular object (e.g., a research article on a particular clinical trial) to be relevant (as discussed above), then the content management system may proactively recommend this object to users 1-3. The recommendation may be, for example, in the form of an email that includes the object (either as an attachment or in the body of the email) or that includes an email with a URL link to the object.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing requests, the method comprising:
   storing, by a processor of a content management system, action tracking entries for various types of actions, the various types of actions comprising read actions, write actions and search actions;
   receiving, by the processor, from a first client, a first request to perform an action with respect to content stored in one or more content repositories;
   obtaining, by the processor, a first persona object for a first user associated with the first request, the first persona object including persona object trend information and a confidence level that specifies an effectiveness of the first persona object for the first user, wherein the object trend information is determined based on action tracking entries associated with at least one user associated with the first persona object and specifies at least one content repository of the one or more content repositories that contain objects determined to be relevant to the at least one user and objects or object types determined to be relevant to the at least one user, and wherein a frequency at which the first persona object is updated is based on the confidence level of the first persona object, wherein the frequency is increased when the confidence level decreases and wherein the frequency is decreased when the confidence level increases;

servicing the first request using the first persona object to obtain a result; and providing the result to the first client.

2. The method of claim 1, further comprising:
creating an action tracking entry associated with the action;
updating the first persona object based, at least in part, on the action tracking entry.

3. The method of claim 1, further comprising:
receiving, from a second client, a second request to perform the action;
obtaining a second persona object for a second user associated with the second request;
servicing the second request using the second persona object to obtain a second result; and
providing the second result to the second client, wherein the second result is different than the first result.

4. The method of claim 1, wherein the first request is a query request and wherein servicing the request comprises modifying the query request based on the first persona object.

5. The method of claim 1,
wherein the first request is a query request;
wherein servicing the first request comprises modifying a result of the query request based on the first persona object to obtain a modified result;
wherein providing the result to the first client comprises providing the modified result to the first client.

6. The method of claim 5, wherein modifying the result comprises modifying a ranking of objects in the result using the first persona object and an implicit ranking associated with at least one of the objects in the result.

7. The method of claim 6, wherein the implicit ranking is determined, at least in part, using an action tracking entry associated with the first user, and is stored in the at least one of the objects.

8. The method of claim 6, wherein the implicit ranking is determined, at least in part, using an action tracking entry associated with a second user, wherein the second user is associated with the first persona object, and is stored in the at least one of the objects.

9. The method of claim 1, wherein the action modifies a confidence level associated with first persona object.

10. The method of claim 9, wherein the confidence level is determined, at least in part, using an action tracking entry associated with the first user, wherein the object stored in the content repository was previously obtained from the first user based on the first persona object.

11. The method of claim 9, wherein the confidence level is determined, at least in part, using an action tracking entry associated with a second user and wherein the second user is associated with the first persona object.

12. The method of claim 1, wherein the first persona object is associated with a plurality of users and wherein the first user is one of the plurality of users.

13. A non-transitory computer readable medium comprising computer readable program code, which when executed by a computer processor enables the computer processor to perform a method for servicing requests, the method comprising:
storing, by a content management system, action tracking entries for various types of actions, the various types of actions comprising read actions, write actions and search actions;

receiving by the content management system, from a first client, a first request to perform an action with respect to content stored in the one or more content repositories;
obtaining, by the content management system, a first persona object for a first user associated with the first request, the first persona object including persona object trend information and a confidence level that specifies an effectiveness of the first persona object for the first user, wherein the object trend information is determined based on action tracking entries associated with at least one user associated with the first persona object and specifies at least one content repository of the one or more content repositories that contains objects determined to be relevant to the at least one user and objects or object types determined to be relevant to the at least one user, and wherein a frequency at which the first persona object is updated is based on the confidence level of the first persona object, wherein the frequency is increased when the confidence level decreases and wherein the frequency is decreased when the confidence level increases;
servicing the first request using the first persona object to obtain a result; and
providing the result to the first client.

14. The non-transitory computer readable medium of claim 13, the method further comprising:
creating an action tracking entry associated with the action;
updating the first persona object based, at least in part, on the action tracking entry.

15. The non-transitory computer readable medium of claim 13, the method further comprising:
receiving, from a second client, a second request to perform the action;
obtaining a second persona object for a second user associated with the second request;
servicing the second request using the second persona object to obtain a second result; and
providing the second result to the second client, wherein the second result is different than the first result.

16. The non-transitory computer readable medium of claim 13:
wherein the first request is a query request;
wherein servicing the first request comprises modifying a result of the query request based on the first persona object to obtain a modified result; and
wherein providing the result to the first client comprises providing the modified result to the first client.

17. The non-transitory computer readable medium of claim 16, wherein modifying the result comprises modifying a ranking of objects in the result using the first persona object and an implicit ranking associated with at least one of the objects in the result, wherein the implicit ranking is stored in the at least one of the objects.

18. The non-transitory computer readable medium of claim 13:
wherein the first request is a query request;
wherein servicing the first request comprises determining a target content repository for the query request; and
issuing the query request only to the target content repository.

19. A system, comprising:
a content repository storing a plurality of objects, wherein the plurality of objects comprises a persona object;
a content management system coupled to the content repository, the content management system including a processor and a memory to store instructions that are executable by the processor to:

store action tracking entries for various types of actions, the various types of actions comprising read actions, write actions and search actions, receive, from a client, a request to perform an action with respect to content stored in the content repository;

obtain a persona object for a first user associated with the request, the persona object including persona object trend information and a confidence level that specifies an effectiveness of the persona object for the first user, wherein the object trend information is determined based on action tracking entries associated with at least one user associated with the persona object and specifies at least one content repository that contains objects determined to be relevant to the at least one user and objects or object types determined to be relevant to the at least one user;

provide the result to the client; and update the persona object with a frequency based on the confidence level of the persona object, wherein the frequency is increased when the confidence level decreases and wherein the frequency is decreased when the confidence level increases.

20. The system of claim 19, wherein the instructions are executable by the processor to:

create an action tracking entry associated with the action;

update the persona object based, at least in part, on the action tracking entry.

* * * * *